United States Patent [19]  [11] 4,401,467
Jordan  [45] Aug. 30, 1983

[54] CONTINUOUS TITANIUM PROCESS

[76] Inventor: Robert K. Jordan, 3979 Tuxey Ave., Pittsburgh, Pa. 15227

[21] Appl. No.: 216,246

[22] Filed: Dec. 15, 1980

[51] Int. Cl.³ .................... C22B 26/10; C22B 22/04; C22B 34/10
[52] U.S. Cl. ........................................ 75/66; 75/84.4; 75/62; 75/68 B; 423/350
[58] Field of Search ............... 75/84.4, 84.5, 56, 57, 75/62, 68 B, 66; 423/84, 493, 499, 492, 610, 611, 341, 350

[56] References Cited

U.S. PATENT DOCUMENTS

| | | | |
|---|---|---|---|
| 703,979 | 6/1903 | Specketer | 75/66 |
| 1,016,758 | 2/1912 | Mehner | 75/66 |
| 1,079,974 | 12/1913 | Bucher | 75/66 |
| 2,018,815 | 10/1935 | Spencer | 75/66 |
| 2,028,390 | 1/1936 | Hanson | 75/66 |
| 2,710,798 | 6/1955 | Hansley | 75/66 |
| 2,781,261 | 2/1957 | Kamlet | 75/84.4 |
| 2,941,867 | 6/1960 | Maurer | 423/350 |
| 2,963,362 | 12/1960 | Muller | 423/492 |
| 2,983,599 | 5/1961 | Carpenter | 75/66 |
| 3,700,430 | 10/1972 | Landt et al. | 75/66 |
| 3,950,489 | 4/1976 | Fukushima | 423/610 |
| 4,032,329 | 6/1977 | Hurd | 75/84.5 |
| 4,044,109 | 8/1977 | Kotzsch et al. | 423/341 |
| 4,183,899 | 1/1980 | Bonsack | 423/492 |

FOREIGN PATENT DOCUMENTS

| | | | |
|---|---|---|---|
| 2314923 | 1/1974 | Fed. Rep. of Germany | |
| 603825 | 4/1926 | France | 75/66 |
| 7009290 | 12/1970 | Netherlands | 75/66 |
| 7505 | of 1903 | United Kingdom | 75/66 |

OTHER PUBLICATIONS

Sittig: "Sodium, Its Manufacture, Properties and Uses," Reinhold Publishing Corp., N.Y., 1956, pp. 229-232.
Brosted: "Comprehensive Inorganic Chemistry," 1957, vol. VI, p. 11.
Kroll: "Present and Potential Uses of Sodium in Metallurgy," p. 146.

Primary Examiner—L. Dewayne Rutledge
Assistant Examiner—J. J. Zimmerman

[57] ABSTRACT

A cyclic, ideally continuous, process for producing titanium which employs the reduction of titanium fluorides by potassium or sodium, or mixtures thereof, to result in titanium particles in molten alkali metal fluoride, which after separation said alkali metal fluoride is combined with a molten ferrous metal to evolve the alkali metal to be recycled from alkali metal iron fluoride that is then combined with a titanium dioxide containing mineral, ideally ilmenite, to evolve titanium tetrafluoride which is recycled. The process may be employed to produce other metals, especially aluminum, silicon and zirconium.

17 Claims, No Drawings

CONTINUOUS TITANIUM PROCESS

This invention relates to a process for cyclically producing titanium, ideally continuously, whereby titanium tetrafluoride is reduced to titanium by sodium or potassium, the alkali metal fluoride thereby produced is in turn combined with molten iron or steel to evolve the alkali metal to be recycled from the alkali metal iron fluoride, and in turn the alkali metal iron fluoride is combined with titanium dioxide or ilmenite to evolve titanium tetrafluoride which can be used as such, reduced to a lower titanium fluoride by hydrogen, or combined with aluminum chloride to produce aluminum fluoride and titanium tetrachloride; and the aluminum fluoride consumed similarly to the titanium tetrafluoride to produce aluminum.

Titanium is commercially produced from titanium tetrachloride and either metallic magnesium or sodium to result in titanium in a matrix of the corresponding metal chlorides. In turn the magnesium chloride or sodium chloride is electrolyzed to the metal with the evolution of chlorine. And then the chlorine is reacted with titanium dioxide, in the form of natural rutile, and carbon to produce titanium tetrachloride. The process is largely limited to using rutile because in the chlorination of ilmenite, much of the chlorine is lost to iron chlorides. And electrolysis of either sodium or magnesium chloride is expensive and energy intensive. Further the reduction process is a batch process requiring protracted high temperature residence times for crystal development of the titanium particles, a lengthy cooling period and finally a difficult extraction of the crystals from the metal chloride matrix. Indeed, these are removed in the sodium based process by using a jack hammer to extract the solid mass of sodium chloride containing titanium crystals, then the mass is crushed and extracted with very dilute hydrochloric acid to remove the sodium chloride while leaving the titanium with a non-oxidized surface.

Clearly, if titanium is to find widespread use it will be imperative to develop a new, integrated process which can be made continuous, and which can be based on very cheap starting materials.

I have discovered a new route to titanium that employes cheap starting materials, ideally ilmenite and molten iron from a blast furnace, whose components can be made continuous and can be integrated. In this process titanium tetrafluoride is combined with molten potassium to result in an exothermic reaction yielding particulate titanium in molten potassium fluoride. While a protracted molten stage can be employed to develop crystal growth to large crystals, ideally the titanium is substantially removed from the potassium fluoride while the latter is in the molten state by magnetic attraction, centrification or by screen separation. Then the molten potassium fluoride is combined with a molten ferrous metal resulting in the evolution of potassium, which is condensed and recycled, from potassium iron fluoride. And titanium dioxide, ideally ilmenite, is then combined with the potassium iron fluoride to evolve titanium tetrafluoride from a mass of potassium iron oxide or iron oxide-potassium fluoride or both. Of course the titanium tetrafluoride is ideally recycled.

In essence then, the molten iron provides for the reducing agent and also process heat. Although as so put forth there would be an imbalance between potassium and fluoride, there are a number of ways for achieving a balance. For example, by converting the potassium iron oxide with water to potassium hydroxide in solution, the iron hydroxide precipitated and removed, and then adding titanium tetrafluoride there is precipitated titanium dioxide, pigment grade, from a potassium fluoride solution which is then evaporated to dryness and recycled in the process. Thus, excepting for make-up K and F, the process can be balanced.

In the ideal mode of the process where the titanium is removed from the molten potassium fluoride, it is desirable to use some sodium along with the potassium to effect a sodium fluoride-potassium fluoride system of the lowest melting temperature. Indeed, sodium can be used entirely instead of potassium, but that entails operating both the titanium tetrafluoride reduction and the molten iron addition steps as considerably higher temperatures; in fact, as sodium fluoride melts at 988° C., as compared to 846° C. for potassium fluoride and there are even lower melting eutectics by at least 100° C., the advantages of a mixed system are clear from the point of view of mechanically or magnetically separating the titanium particles from the molten alkali metal fluoride melt.

Should it be desired to effect titanium separation from a cooled solid matrix of alkali metal fluoride, as by water extraction, then it is very desirable to limit or omit sodium, because sodium fluoride is only poorly soluble whereas potassium fluoride is very, very soluble far greater than the solubility of even sodium chloride in water.

In the primary reduction step, the liquid alkali metal can be combined with any of solid, gaseous or liquid titanium tetrafluoride, ideally with pumped in liquid titanium tetrafluoride. But as will be seen later, lower titanium fluorides such as $TiF_2$, or the others may be employed since they can be easily made from titanium tetrafluoride. The injected alkali metal should be at a temperature to almost instantly effect reaction, about or over 370° C. for sodium and lower for potassium. At atmospheric pressure titanium tetrafluoride sublimes at 284° C., thus to maintain it as a liquid to the injection point it is necessary to maintain it under pressure at a more elevated temperature, ideally between 320° C. and 400° C. Since it can react almost instantaneously once injected into the potassium-potassium fluoride mix it is not necessary to conduct the reduction under the same high pressures; indeed, that is best conducted at below 3 atmospheres, ideally at or just above atmospheric pressure. This is the case whatever the form of titanium fluoride injected, liquid, solid or gas.

For a continuous process the alkali metal should be at a temperature where it reacts very rapidly, but if the process is made discontinuous it is only preferred that the alkali metal be in the molten state when charged.

Once initiated the reaction between the alkali metal and the titanium fluoride is very rapid and exothermic usually reaching about 900° to 950° C. Thus in a continuous reactor fed from or near to the top there is ample heat to maintain the continuation whatever the temperature of the incoming materials.

The initially formed titanium particles are very small; in the conventional titanium processes it is necessary to maintain the molten state for protracted periods to enable crystal growth or agglomeration to particle sizes of easy removal, typically averaging about 2 cm., but varying greatly. This can be done likewise by my process, but it is, as noted ideal to separate the particles from the molten alkali fluoride. Under such conditions it is not necessary that the particle size be large at all, ergo a very short residence time may be employed.

As the titanium particles are much more dense than the medium in which they are suspended, separation can largely be effected by gravity most easily realized by allowing settling in an enlarged chamber where the flow rate will not make settling difficult. Then periodically via a series of locks, protected by argon, a mass of particles can be removed with relatively small amounts of the alkali metal fluoride. Thus the mass can be allowed to cool and extracted to isolate essentially pure titanium.

Alternatively and ideally, the particles of titanium can be reseparated magnetically; titanium does have a small magnetic susceptibility, ergo using a superconductor or other powerful magnet the particles can be gathered by employing a force exerted from outside the reactor or separation unit. Thus the particles can be drawn against a wall and then by releasing the field allowed to drop into a separated compartment from which they are withdrawn. Indeed, using a "u" tube type reactor the particles can be collected in an upper chamber or on a screen, which can be moving, to carry them into a chamber from which the essentially alkali metal fluoride free particles can be scraped off and removed in mass. As magnetism can be transmitted, the particles can be collected by an internally operated magnet to attract the particles onto a plate or other device that can withdrawn periodically to deposit them into a recepticle.

In another way the particles may be similarly thrown into a wall filter compartment by employing centrification by means of a rotating device extending into the molten suspension; and the particles can be backwashed from the filter or sceen using another medium of much lower melting temperature, for example titanium trichloride or mixtures thereof. Even simple screens may be employed that can be mechanically turned from the molten suspension to throw the particles into a withdrawing chamber. Of course, in any of the chambers or open places in the reducing system it is desirable to employ an inert gas, ideally argon. This because of the sensitive nature of the titanium at high temperatures and also because of the normal procedure to employ a slight excess of alkali metal compared to titanium halide.

Of course, the suspension of titanium particles in alkali fluoride can be handled in the same manner as now employed commercially, i.e. allowed to cool and solidify followed by extraction. A more useful method is to continuously cast the suspension into an easily cooled shape and then extracting it continuously or intermittantly. By extracting with very dilute hydrofluoric acid or other hydrohalic acid, oxidation of the particles can be avoided and excess alkali metal converted. Then the alkali metal fluoride solution can be evaporated to dryness, or even melted, for use in the next step of the process.

There is a special case where there is no need to separate the titanium particles from the alkali metal fluoride; the melt can simply be directly charged to the next step, or alternatively it may be solidified, i.e. titanium particles suspended in a solid matrix of alkali metal fluoride, to be charged to the next step.

The next step of the process is the combining of the alkali metal fluoride and a molten ferrous metal to result in the evolution of the alkali metal as a gas which can be subsequently condensed and recycled. The residual material being alkali metal iron fluoride. By employing a controlled excess of the molten ferrous metal as compared to that required to combine with the alkali fluoride, it can provide additional heat, or, as in the special case noted above, it can combine with the unseparated titanium particles to result in a ferrotitanium alloy. Thus, there is at least one iron-titanium alloy with a melting temperature of about or below 1,000° C.; a relatively high titanium alloy that is easily separated in the molten state and which is very useful for producing cast products such as engine blocks to result in a relatively lighter weight product as compared to cast iron or cast steel.

The second step of the process then employs a molten ferrous metal which can range in carbon content up to about 8% and can be steel, blast furnace hot metal, ferromanganese or other alloys. As the ferrous metal and alkali metal fluoride combine very exothermically, it is desirable to maintain excess alkali metal iron fluoride in the reaction zone. As molten iron from a cupola or blast furnace melts at about 1100° C. whereas steel melts at about 1535° C., it is preferable from a handling point of view and also from an economic standpoint to employ the lower melting ferrous metals. Fortuitously, the advent of continuous casting for steel has resulted in the technology for the continuously supplying either iron, i.e. of above 2% carbon, usually 3 to 4.5% carbon, or steel which technically is of less than about 2.00% carbon content and ideally the metal most simply produced by the basic oxygen process.

When a mixture of alkali metal fluorides is employed the process can rather selectively volatilize potassium while forming sodium iron fluoride. Thus if the ratio is two moles potassium fluoride to one mole of sodium fluoride very high potassium recoveries can be effected in that it boils as 760° C. as compared to 883° C. for sodium. This allows several interesting options as will be discussed later.

Ideally the mass of alkali metal iron fluoride is maintained in the molten state which depending on the ratios of potassium and sodium fluorides employed may necessitate the use of excess alkali metal fluoride. Alternatively, as noted, such can be maintained by employing excess molten ferrous metal, or, depending on the temperature, neither. Indeed, the mass may be withdrawn as a solid although if so, with cooling.

In the third step of the overall process then, the alkali metal iron fluoride is combined with natural rutile or other form of titanium dioxide, ideally ilmenite, $FeTiO_3$. Again the reaction is ideally effected using molten alkali metal iron fluoride whist titanium tetrafluoride is evolved. The yield for this step can be increased by injecting oxygen or air or mixtures to minimize the amount of residual fluoride and result in the iron in a highly oxidized state. While it would be preferred to maintain this step totally in the molten state too, that is more difficult than with the other steps. Thus an added reason for injecting oxygen or air is to effect cooling, ideally from the bottom of the reactor, ergo facilitating removal of the solids therefrom; for example as would be done from a vertical limekiln.

A means for mixing the ilmenite or other form of titanium dioxide may be employed in the third step although by injecting the ore as a powder can satisfactorily effect this because of the mixing effect of the evolving titanium tetrafluoride.

Normally titanium ores contain some silica which will result in the coevolution of silicon tetrafluoride, but this is easily separated because of the great difference in boiling temperatures. But of course it is most desirable to employ ores having a minimum of silica.

Because of the very high temperature of the molten alkali metal iron fluoride the titanium tetrafluoride evolved will likewise be at a temperature far above its atmospheric sublimation temperaure, 284° C. And as it is desirable to handle the intermediates of the process as liquids, the third step may be effected under considerable pressure to result in maintaining the titanium in a liquid state on subsequent condensation since titanium tetrafluoride under pressure melts at about or above 400° C. Alternatively the evolved gaseous titanium tetrafluoride at only slight pressure may be subsequently compressed to the liquid state. However, it should be realized that any of gaseous, liquid or solid titanium tetrafluoride may be recovered and employed in the first step or other processes.

Because very hot titanium tetrafluoride is evolved from step three, it is amenable to change if desired. Thus by combining it hot with hydrogen, lower titanium fluorides, for example titanium tetrafluoride, can be produced with the evolution of recoverable hydrogen fluoride. By using such reduced forms of titanium fluorides in the first step of the process substantial conservation of alkali metal can be effected. Further, a given piece of equipment can provide increased capacity of producing titanium.

Another use for all or part of such evolved titanium tetrafluoride lies in using it to make other metal fluorides, for example aluminum trifluoride from aluminum trichloride, wherein titanium tetrachloride leaves as a gas from aluminum trifluoride. Clearly other metal fluoridies of lower volatility whose chlorides have fair volatility can be similarly made, for instances zirconium, hafnium.

Then it is simple to convert step 1 to utilize these fluorides or lower fluorides thereof, to produce the metals. For example using aluminum fluoride with the alkali metals molten aluminum would be made which can easily be separated, as it is in the conventional aluminum process from cryolite, from the molten alkali metal fluorides, or if desired from NaAlF$_4$ or Na$_3$AlF$_6$. And zirconium or hafnium made in the same way as titanium.

After step three, the residue will normally contain alkali metal oxide combined with an iron oxide; by dumping this into water ideally ferric hydroxide, and hematite if ilmenite is employed along with oxygen, and a solution of the alkali metal hydroxide will be obtained. The iron compounds can all be separated.

Then the potassium hydroxide therefrom may be combined with any unbalance titanium fluoride to result in the precipitation of titanium dioxide from an aqueous solution of potassium fluoride; and then the potassium fluoride solution can be evaporated to dryness and recycled to step 2. Titanium dioxide so made is a valuable pigment, usually made from titanium tetrachloride and this could be a product for the titanium tetrachloride evolved from making other metal fluorides and metals. Sodium hydroxide is best marketed.

By using sand or other form of silica, the process can be practically identically employed for the production of silicon. And of course, alloys of the various metals noted can be made.

Makeup alkali metal and fluoride is best in the form of alkali metal titanium hexafluoride which may be introduced in step 1 to at least partly replace titanium tetrafluoride.

According to the provision of the patent statute I have explained the principle of my invention and have illustrated and described what I now consider to represent its best embodiment. However, I desire to have it understood that within the scope of the appended claims, the invention may be practiced otherwise.

I claim:

1. A process for the production of titanium comprising:
   combining a titanium fluoride and at least one of sodium and potassium to produce titanium and at least one of sodium and potassium fluorides;
   combining a molten ferrous metal and at least one of the alkali fluorides to evolve at least one alkali metal from an alkali iron fluoride, and
   combining alkali iron fluoride and a mineral comprising titanium dioxide and oxygen to evolve titanium tetrafluoride from alkali iron oxide.

2. The process of claim 1 where the titanium tetrafluoride is reduced to a lower titanium fluoride.

3. The process of claim 1 where oxygen as air is combined in the alkali metal iron fluoride-titanium dioxide step.

4. The process of claim 1 wherein the suspension of titanium in the molten alkali metal fluoride is combined with an excess of a molten ferrous metal to produce an alkali metal iron fluoride and an alloy of iron and titanium.

5. The process of claim 1 wherein the alkali iron oxide produced from the evolution of titanium tetrafluoride is combined with water to provide a solution of potassium hydroxide that is combined with a titanium fluoride to produce titanium dioxide and an aqueous solution of potassium fluoride, said solution evaporated to essentially anhydrous potassium fluoride.

6. The process of claim 1 wherein the suspension of titanium in molten alkali metal fluoride is separated and the molten alkali fluoride is combined with the molten ferrous metal continuously.

7. The process according to claim 1 for the production of titanium wherein metallic titanium particles are separated directly from the molten alkali fluoride resulting from combining sodium or potassium and titanium tetrafluoride.

8. The process of claim 7 or 6 wherein said titanium is separated from the molten alkali fluoride magnetically.

9. The process of claim 7 where the titanium is separated from the molten alkali fluoride by filtration.

10. A process for the production of silicon comprising,
    combining sodium or potassium and a silicon fluoride to produce metallic silicon and the corresponding alkali metal fluoride in a molten state,
    combining said molten alkali metal fluoride and a molten ferrous metal to produce the corresponding alkali metal and alkali metal iron fluoride, and
    combining said alkali metal iron fluoride and silicon dioxide to evolve silicon tetrafluoride.

11. The process of claim 10 where the evolved silicon tetrafluoride is reduced to a lower silicon fluoride.

12. A process for the production of metals whose fluorides are reducible by alkali metals comprising,
    combining a metal whose fluoride is reducible by sodium or potassium and at least one of sodium and potassium to result in a
    separate phase of the free metal in at least one of molten sodium fluoride and potassium fluoride, separating said free metal from said molten alkali fluorides, combining said molten alkali fluorides and molten iron to evolve at least one of sodium and potassium from alkali iron fluoride.

13. The process of claim 12 where the metal produced is aluminum.

14. The process of claim 12 where the metal produced is zirconium.

15. A process for the production of sodium or potassium comprising combining a molten ferrous metal and molten sodium or potassium fluoride to evolve gaseous sodium or potassium and recovering said potassium or sodium.

16. The process of claim 15 where the molten ferrous metal is steel from a basic oxygen process or iron from a cupola or blast furnace.

17. A process for the production of alkali iron fluorides and at least one of potassium and sodium comprising combining a molten ferrous metal and at least one of molten potassium fluoride and sodium fluoride to evolve at least one of potassium and sodium for an alkali iron fluoride and recovering said potassium or sodium.

* * * * *